June 25, 1963  G. MORESSÉE ETAL  3,095,516
ARMATURE COIL FOR AXIAL AIR GAP MACHINES
Filed March 2, 1960  2 Sheets-Sheet 1
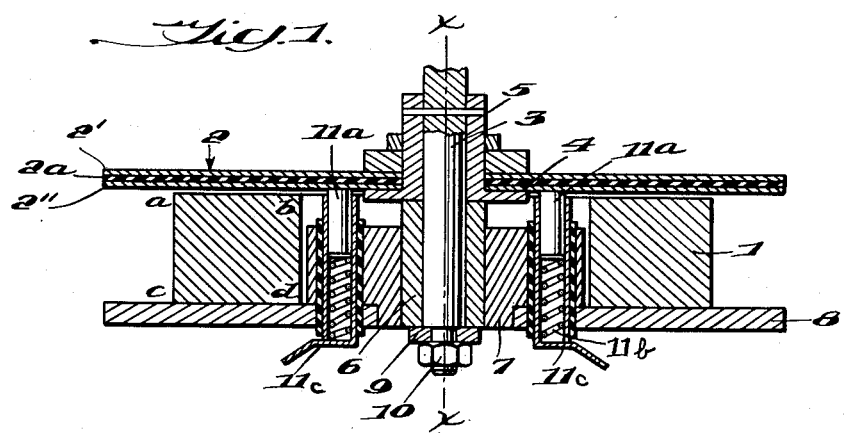
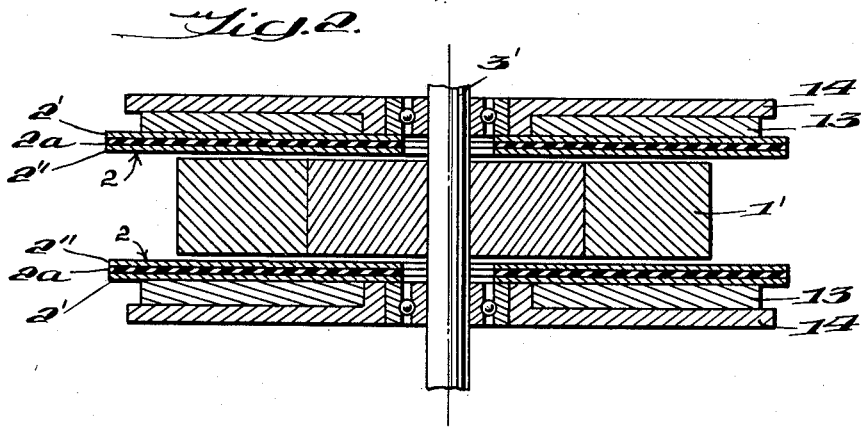
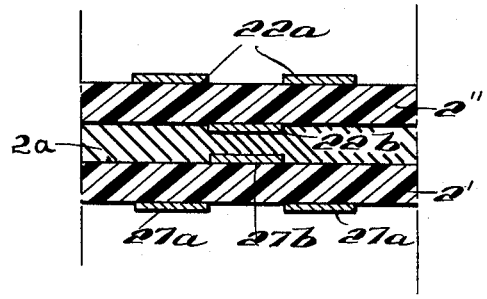
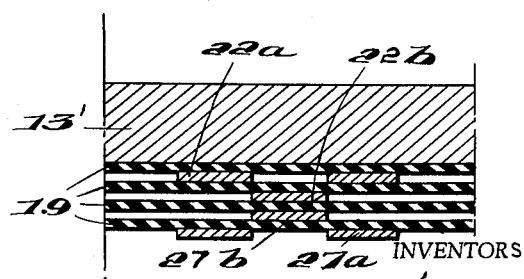
INVENTORS
Georges Moressée
Robert Déchet
BY Pierce, Scheffler & Parker
ATTORNEYS June 25, 1963
G. MORESSÉE ETAL
3,095,516
ARMATURE COIL FOR AXIAL AIR GAP MACHINES
Filed March 2, 1960
2 Sheets-Sheet 2
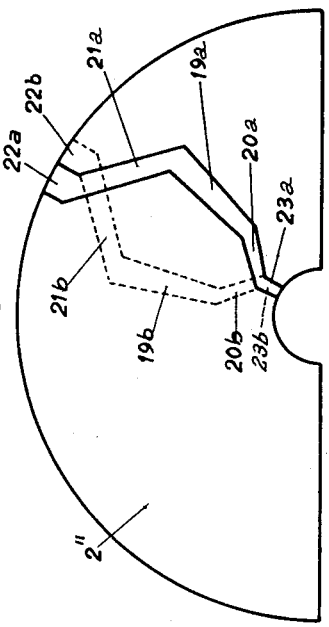
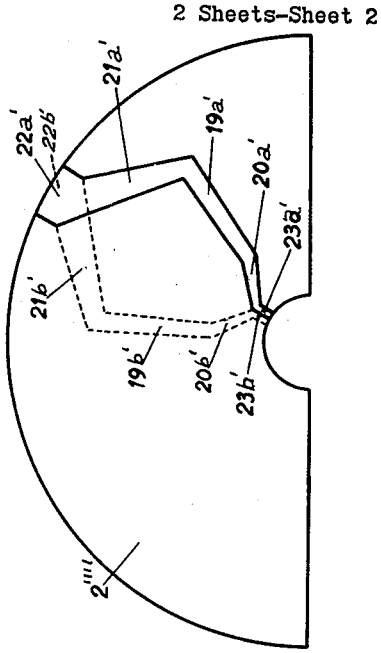
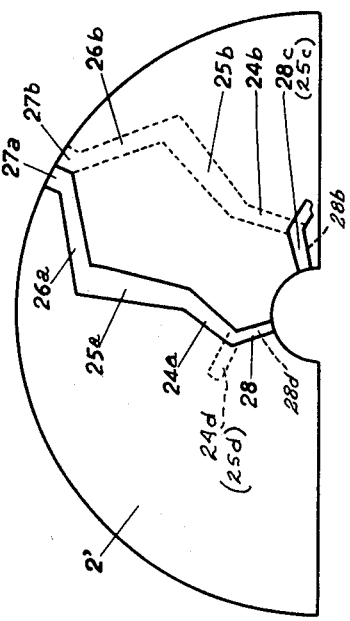
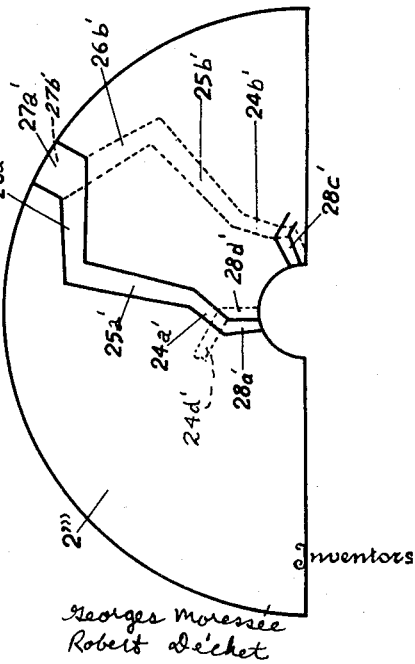
Inventors
Georges Moressée
Robert Déchet
By Pierce, Scheffler & Parker
Attorneys

United States Patent Office 3,095,516
Patented June 25, 1963

3,095,516
ARMATURE COIL FOR AXIAL AIR GAP MACHINES
Georges Moressée, Neuilly-sur-Seine, and Robert Déchet, Boulogne-sur-Seine, France, assignors to Normacem S.A., Paris, France, a French body corporate
Filed Mar. 2, 1960, Ser. No. 12,395
Claims priority, application France Apr. 30, 1959
3 Claims. (Cl. 310—268)

This invention relates generally to an armature coil construction for axial air gap electrical machines, and more particularly to an armature coil construction having alternate wave-shaped and overlapping series-connected coil turns.

Axial air gap motors and generators have the disadvantage that they can operate only at relatively low direct-current or alternating-current voltages. This defect in the past has been inevitable due to the limited number of laminated conductors that can be arranged on an insulation supporting disk. Since it is always necessary to interconnect, by their ends, for that purpose placed in spacial coincidence, the laminated conductors arranged on opposite sides of the insulating support disk, and as these interconnections are generally made by means of metallized perforations, the conductors must at the start have a section and especially a width which are sufficient for this purpose, for otherwise the perforations either could not be made at all or would dangerously weaken the ends of the conductors in which they are made. This technological imperative always limits the number of conductors which could be connected in series on a support disk of given dimensions and consequently the operating voltages of the machine were limited to low values relative to the values of the low voltage distribution lines.

The primary object of the present invention is to provide a flat armature structure for axial air gap rotary machines having at least two insulating disks upon which are mounted, respectively, wave-shaped and overlapped coil turns alternately connected in series, whereby the number of conductors for a machine of a given size is greatly increased.

Another object of the present invention is to provide an armature structure for axial air gap machines consisting of a pair of supporting disks separated by an insulator, each of said disks having conductive half coil turn segments formed on both sides thereof by well known printed circuit techniques.

A more specific object of our invention is to provide an axial air gap machine armature structure consisting of two insulating disks each having conductive half turn segments formed by printed circuit techniques on both sides thereof, said disks being separated by an insulating layer, the winding segments being so connected that wave-shaped coil turns and overlapping coil turns are connected in series.

Other objects and advantages of our invention will become more apparent from a study of the following specification when considered in conjunction with the accompanying drawings in which:

FIG. 1 is a longitudinal sectional view of a direct-current axial air gap machine using a multiple coil armature according to the present invention;

FIG. 2 is a longitudinal sectional view of an alternating-current axial air gap machine utilizing two multiple coil armatures according to the instant invention;

FIG. 3 is a detailed plan view of an annular armature disk having wave-shaped coil turns thereon, each coil turn having half-turn segments on opposite sides of the disk, said coil half-turn segments being joined at the inner periphery of the disk;

FIG. 4 is a detailed plan view of an annular armature disk having overlapped coil turns thereon, the half-turn segments of each coil turn being on opposite sides of the disk, said segments being joined at the inner periphery of the disk;

FIG. 5 is a detailed plan view of an annular armature disk having wave-shaped coil turns thereon, each coil turn having half-turn segments on opposite sides of the disk, said coil half-turn segments being joined at the outer periphery of the disk;

FIG. 6 is a detailed plan view of an annular armature disk having overlapped coil turns thereon, each coil turn having half-turn segments on opposite sides of the disk, said coil half-turn segments being joined at the outer periphery of the disk;

FIG. 7 is a tangential peripheral section of an armature element including the disk of FIGS. 3 and 4 and showing the ends of the conductors which are to be connected; and FIG. 8 is a similar sectional view of another embodiment of the invention.

Referring now to FIG. 1, the axial air gap D.-C. machine includes an annular magnet 1 formed by the generation of a rectangle (or square) $a, b, d, c$ about the longitudinal axis x—x. This stationary magnet, which constitutes the inductor element, cooperates with the armature 2 which consists of disks 2', 2" separated by a layer of electrical insulation 2a. The disks 2', 2" may be formed by a synthetic resin or plastic and each disk has conductors applied to both sides thereof by suitable known printed circuit techniques. The insulation layer 2a may consist of either a solid insulation or a suitable insulating lacquer.

The armature 2 is mounted upon the flange portion of flanged sleeve 4 which in turn is secured to the shaft 3 by means of pin 5. Shaft 3 rotates in the self-lubricated sleeve 6 which is mounted within the ring 7. Ring 7 is mounted on iron plate 8 which may or may not serve as a yoke. Magnet 1 is also secured to iron plate 8 by suitable securing means (not shown). The axial air gap between the thin rotating armature 2 and the magnet 1 is determined by the length of the sleeve 6 and by the axial position of shaft 3 which may be adjusted as desired by means of washer 9 and nut 10 which is threadably mounted upon the end of shaft 3.

Contact brushes 11a are mounted in brush supports 11 secured to plate 8 and are biased into contact with the under surface of the armature 2 by means of spring 11b through which current is transmitted to the electrical leads 11c. These brushes wipe against the conductor segments of the coil turns disposed radially on the lower surface of disk 2", which segments are connected to similar segments on the opposite sides of disk 2" and to segments on opposite sides of disk 2' as will be explained below.

In the alternating-current machine illustrated in FIG. 2, the induction element or torus magnet 1' is fastened upon shaft 3'. Two armatures 2 (identical to the armature of FIG. 1) are each secured to soft iron magnetic plates 13 supported on metallic disks 14 so that the magnetic flux of the magnet extending to the magnetic plates 13 traverses the armatures 2. Thus upon rotation of the armature units (2, 13 and 14) relative to the shaft 3' and the magnet 1', the coil turns on the armature disks will cut across the magnet flux extending between the magnet and the soft iron plates.

Referring now to FIG. 3, coil half-turn segments 25a and 25c (partially shown) are on the upper side of disk 2' and coil half-turn segments 25d (partially shown) and 25b are on the lower side of disk 2'. As will be explained below, coil segments 25d and 25a constitute a wave-shaped coil turn, and coil segments 25b and 25c also constitute a wave-shaped coil turn. Segment 25a is connected to the adjacent segment 25d (only a portion of which has been shown) by a bridging connection at the extremities of portions 28a, 28d adjacent the inner periphery of the disk. Turn halves 25a and 25b are not connected at their end portions 27a, 27b adjacent the outer periphery of the disk. Half turn 25b is connected to the next adjacent half turn 25c (only a portion of which has been shown in the drawing) by a bridging connection at the segment portions 28b, 28c adjacent the inner periphery of the disk. Thus it is apparent that the segment pairs 25a, 25d and 25b, 25c of FIG. 3 are connected at their ends adjacent the inner periphery of the disk to form two separate wave-shaped coil turns.

Similarly, in FIG. 4, the half-turn segment 19a on one face of disk 2″ is connected to the segment 19b on the opposite face of the disk by a bridging connection at the portions 23a, 23b adjacent the inner periphery of the disk. The two segments 19a, 19b thus form one coil turn of an overlapping configuration.

According to the invention, the free end 27a, of the wave-shaped coil turn on disk 2′ is connected to the free end 22a of the overlapping coil turn on disk 2″. Free end 22b on disk 2″ is likewise connected to free end 27b of the next coil turn on disk 2′, and so on. Thus it is apparent that each turn of the wave-shaped coil is interrupted at the outer periphery of the disk 2′ and between the free ends 27a, 27b of adjacent coil turns an overlapped coil turn is connected at portions 22a, 22b. In other words, the armature 2 has a winding which includes successively in series a wave-shaped turn (25d, 25a), an overlapping turn (19a, 19b), and a wave-shaped turn (25b, 25c).

In the example described above with reference to FIGS. 3 and 4, the open end of the turns are located at the outer peripheries of the disks and this is desirable to provide access space for facilitating the connections between the coil turns on one disk to the coil turns on the other disk. However, it is quite evident that the coil half turns on opposite sides of the disks might be connected at the outer peripheries of the disks as shown in FIGS. 5 and 6. In FIG. 5, the coil half-turn segment 25a′ on disk 2‴ is connected to half-turn segment 25b′ at the outer end portions 27a′, 27b′, and in FIG. 6 the half-turn segments 19a′ 19b′ on disk 2⁗ are connected at their outer end portions 22a′, 22b′. By connecting free end 28d′ to free end 23a′ and by connecting free end 23b′ to end 28a′, coil segments 19a′, 19b′ 25a′ 25b′ will be connected in series. Thus the armature winding will include overlapping coil turns and wave-shaped coil turns alternately connected together in series.

It is also obvious that, if desired, the open ends 27a, 27b of FIG. 3 may be crossed in the manner of ends 22a and 22b in FIG. 4, and vice versa.

FIG. 7 represents diagrammatically the sections of disks 2′, 2″ corresponding to the construction of FIGS. 3 and 4. Each outer free end is separated from the adjacent free ends on the same side of the disk by a spacing equal to the width of the segment.

Referring now to FIG. 8, an armature modification is illustrated formed by the so-called "thin insulator" process wherein the conductive segments are arranged (by printed circuit techniques) only on one side of an insulating layer. Since the mechanical stresses are transmitted to support 13′, the insulation layers 19 may be quite thin (for example, on the order of the one-tenth of a millimeter). If desired, the insulation layers could be replaced by an insulating lacquer layer. Under these conditions, regardless of the number of insulation layers, the air gap is maintained at an acceptable value, especially when the conductors are made of ferromagnetic material.

The connections between the conductive segments are as described above.

In the foregoing examples the composite armature permits a doubling of the voltage at the terminals of the machine. According to the principles of the present invention a still higher multiple of voltage can be obtained. For example, the voltage could even be tripled in axial air gap machines.

In this case an overlapped coil turn, a wave-shaped coil turn, and another overlapped coil turn are superimposed, the ends 28 in the example of FIG. 3 being separated and insulated from each other to permit the connection of the ends 23a′ and 23b′ separated by a coil turn as shown in FIG. 6.

It is obvious, however, that the invention could also be applicable to various other combinations of flat coils of any type.

While in accordance with the provisions of the patent statutes we have illustrated and described the best forms and embodiments of our invention now known to us, it will be apparent to those skilled in the art that other changes may be made in the apparatus described without deviating from the scope of the invention set forth in the following claims:

We claim:
1. In an axial air gap electrical machine having a stator and an armature, the improvement wherein said armature includes at least two parallel non-conductive disks each having coil half-turn segments on both sides thereof, said disks being separated by a layer of electrical insulation, the half-turn segments on one disk being connected to form separate wave-shaped coil turns and the half-turn segments on the other disk being connected to form separate overlapped-shaped coil turns, and means connecting said wave-shaped turns and said overlapped-shaped turns alternately in series.

2. Apparatus as defined in claim 1 wherein said disks are annular and said half-turn segments are applied thereon by standard printed circuit techniques, the half-turn segments on one side of each disk being connected to half-turn segments on the opposite side of the disk adjacent the inner periphery thereof, said means connecting the wave-shaped turns and the overlapped-shaped turns in series being adjacent the outer peripheries of said disks.

3. In an axial air gap electrical machine having a stator and an armature, the improvement wherein said armature includes at least four groups of planar radially-arranged half-turn coil segments, said groups being parallel and separated by layers of electrical insulation, all the half-turn coil segments being radially arranged relative to a given linear axis, the half-turn segments of a first two groups thereof being connected in pairs to form a plurality of separate wave-shaped type coil turns and the half-turn segments of a second two groups of segments being connected in pairs at their ends to form a plurality of separate overlapped-type coil turns, and means connecting said wave-shaped turns and said overlapped-shaped turns alternately in series.

References Cited in the file of this patent

"D.-C. Motor Has Printed Armature," Electronics, Mar. 20, 1959, pp. 70, 72 and 73.